(12) United States Patent
Alsina et al.

(10) Patent No.: US 10,318,114 B2
(45) Date of Patent: Jun. 11, 2019

(54) PLAYLIST-ONLY MEDIA ITEMS

(71) Applicant: APPLE INC., Cupertino, CA (US)

(72) Inventors: Thomas Alsina, Mountain View, CA (US); Edward T. Schmidt, Burlingame, CA (US); Taylor G Carrigan, San Francisco, CA (US); Christopher J. Sanders, San Jose, CA (US); Cody D. Jorgensen, Cupertino, CA (US); Arvind S. Shenoy, Cupertino, CA (US); Amandeep S Jawa, Cupertino, CA (US); George D. Bottas, Cupertino, CA (US); Matthew J. Cielak, Cupertino, CA (US); Paul C. Irvine, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/271,197

(22) Filed: Sep. 20, 2016

(65) Prior Publication Data

US 2017/0212644 A1    Jul. 27, 2017

Related U.S. Application Data

(60) Provisional application No. 62/286,410, filed on Jan. 24, 2016.

(51) Int. Cl.
*G06F 16/438* (2019.01)
*G06F 3/0482* (2013.01)

(52) U.S. Cl.
CPC ........ *G06F 3/0482* (2013.01); *G06F 16/4387* (2019.01)

(58) Field of Classification Search
CPC ................ G06F 3/0482; G06F 17/30053
See application file for complete search history.

(56) References Cited

U.S. PATENT DOCUMENTS

| | | | | |
|---|---|---|---|---|
| 8,079,044 B1* | 12/2011 | Craner | ............... | H04N 21/4532 725/28 |
| 8,266,115 B1* | 9/2012 | Park | .................. | G06F 17/30864 707/692 |
| 2004/0267825 A1* | 12/2004 | Novak | ................. | G11B 27/105 |
| 2006/0272483 A1* | 12/2006 | Honeywell | ............... | G10F 1/02 84/609 |
| 2006/0292537 A1* | 12/2006 | Nute | ........................ | G09B 5/06 434/307 A |

(Continued)

*Primary Examiner* — Nicholas Klicos
(74) *Attorney, Agent, or Firm* — Fletcher Yoder PC

(57) ABSTRACT

In some implementations, a computing device can be configured to manage playlist-only media items for a user's media library. For example, when a user adds a media item to a playlist, the user can be presented with an option to add the media item to the playlist as a playlist-only media item. When the user selects to add the media item to the playlist as a playlist-only media item, the computing device can update media metadata associated with the user's media library with data indicating that the media item is a playlist-only media item. When the computing device performs operations (e.g., displaying, searching, etc.) on the user's media library, the computing device can exclude the playlist-only media items from the operations. The computing device can change the playlist-only settings for a media item to add and/or remove a media item from the user's media library.

18 Claims, 13 Drawing Sheets

(56) References Cited

U.S. PATENT DOCUMENTS

| | | | |
|---|---|---|---|
| 2007/0038672 A1* | 2/2007 | Plastina | G06F 17/30026 |
| 2007/0048714 A1* | 3/2007 | Plastina | G06F 17/30775 |
| | | | 434/308 |
| 2007/0055754 A1* | 3/2007 | Robbin | G07F 17/16 |
| | | | 709/223 |
| 2008/0009268 A1* | 1/2008 | Ramer | G06F 17/30867 |
| | | | 455/412.1 |
| 2008/0288890 A1* | 11/2008 | Anderson | G11B 27/105 |
| | | | 715/810 |
| 2011/0119583 A1* | 5/2011 | Gilley | G11B 27/002 |
| | | | 715/716 |
| 2012/0095962 A1* | 4/2012 | Goldman | G06F 17/30038 |
| | | | 707/634 |
| 2013/0110888 A1* | 5/2013 | Kosovan | G06F 17/3007 |
| | | | 707/822 |
| 2013/0317936 A1* | 11/2013 | Hughes | G06Q 30/06 |
| | | | 705/26.5 |
| 2015/0120681 A1* | 4/2015 | Behe | G06F 17/30117 |
| | | | 707/692 |
| 2015/0301692 A1* | 10/2015 | Patsiokas | H04N 5/76 |
| | | | 715/716 |
| 2015/0347444 A1* | 12/2015 | Jalon | G06F 17/30044 |
| | | | 707/692 |
| 2017/0046339 A1* | 2/2017 | Bhat | G06F 17/30026 |
| 2017/0068670 A1* | 3/2017 | Orr | G06F 17/30038 |

\* cited by examiner

| Identifier 202 | Metadata 204 | Asset Pointer 206 | Playlist Only 208 |
|---|---|---|---|
| ID_122 | Artist, genre, tempo, … | Ptr_122 | False |
| ID_124 | Artist, genre, tempo, … | Ptr_124 | False |
| ID_132 | Artist, genre, tempo, … | Ptr_132 | True |

FIG. 2

PLAYLIST-ONLY MEDIA ITEMS

CROSS-REFERENCE TO RELATED APPLICATIONS

This application claims priority to U.S. Provisional Application Ser. No. 62/286,410, filed Jan. 24, 2016, the content of which is incorporated herein by reference in its entirety.

TECHNICAL FIELD

The disclosure generally relates to managing media items on a computing device.

BACKGROUND

Modern technology allows users to collect, curate, and/or manipulate digital media. Often, a user's digital media library becomes cluttered with media items that do not fit with the user's media tastes. For example, the user may create a playlist (e.g., an ordered collection of media items) for a friend that includes media items (e.g., songs) that the user does not like. However, in order to create the playlist, the user may have to add the media items for the playlist to the user's media library because playlists are built from media items in the user's library. Thus, the user's media library may become cluttered with media items that the user may not want included in the user's media library.

SUMMARY

In some implementations, a computing device can be configured to manage playlist-only media items for a user's media library. For example, when a user adds a media item to a playlist, the user can be presented with an option to add the media item to the playlist as a playlist-only media item. When the user selects to add the media item to the playlist as a playlist-only media item, the computing device can update media metadata associated with the user's media library with data indicating that the media item is a playlist-only media item. When the computing device performs operations (e.g., displaying, searching, etc.) on the user's media library, the computing device can exclude the playlist-only media items from the operations. The computing device can change the playlist-only settings for a media item to add and/or remove a media item from the user's media library.

Particular implementations provide at least the following advantages. Playlist-only media items allow a user to create playlists that include, perhaps undesirable, media items without having the media items show up in the user's media library. Playlist-only media items allow the user to have more control over which media items show up in the user's library, search results, etc.

Details of one or more implementations are set forth in the accompanying drawings and the description below. Other features, aspects, and potential advantages will be apparent from the description and drawings, and from the claims.

DESCRIPTION OF DRAWINGS

FIG. 2 illustrates example media metadata for implementing playlist-only media items.

Like reference symbols in the various drawings indicate like elements.

DETAILED DESCRIPTION

System Overview

Figure 1:
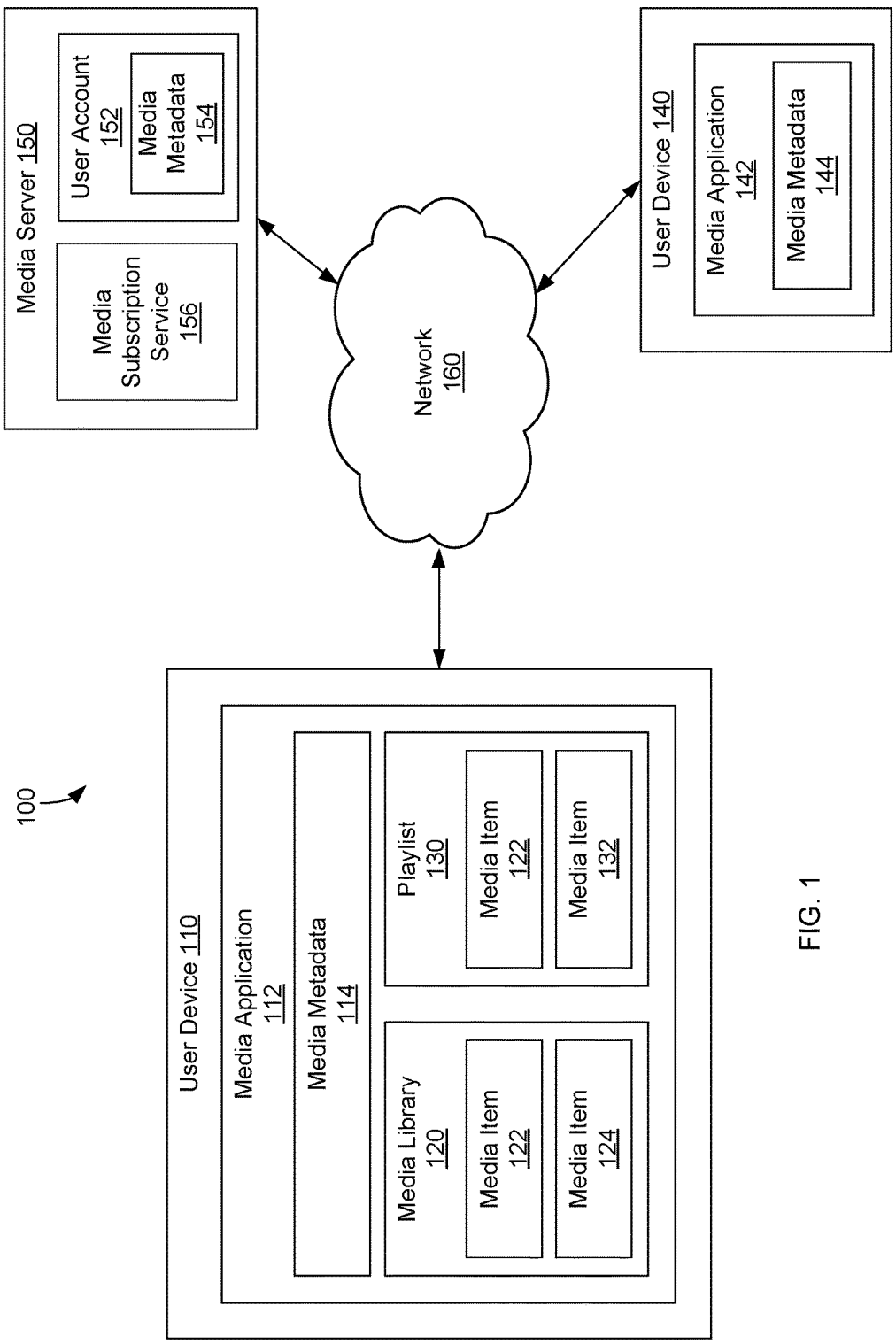
FIG. 1 is a block diagram of an example system for implementing playlist-only media items.

FIG. 1 is a block diagram of an example system 100 for implementing playlist-only media items. For example, system 100 can be configured to allow the user to create playlists that include playlist-only media items that are not added to or included in the user's media library. Thus, the user can create playlists (e.g., for friends, colleagues, clients, etc.) that include media items that do not correspond to the user's media tastes without cluttering the user's media library with the media items in the playlist.

In some implementations, system 100 can include user device 110. For example, user device 110 can be a computing device such as a laptop computer, smartphone, tablet computer, or wearable device (e.g., a smartwatch, smart glasses, etc.). User device 110 can be one of several similarly configured user devices, such as user device 140, that provide features for managing, synchronizing, accessing, and/or playing media items (e.g., music, audio books, movies, videos, etc.).

In some implementations, user device 110 can be configured with media application 112. For example, media application 112 can be a multimedia software application installed and/or running on user device 110 that provides functionality for accessing and/or managing media on user device 110. While media application 112 can be configured to access and/or manage a variety of media types (e.g., music, audio books, movies, videos, etc.) this specification will describe the features of media application 112 in terms of media items or music media for simplicity and ease of understanding.

In some implementations, media application 112 can be configured to manage a user's media library. For example, media application 112 can manage information describing media items (e.g., songs, audio tracks, etc.) purchased by the user of user device 110. Media application 112 can manage information describing media items obtained from a subscription services. For example, when a user purchases a song, media application 112 can download the song and add metadata associated with the song to media metadata 114.

Similarly, when a user downloads, likes, or creates a playlist including a song from a music subscription service, media application 112 can add metadata associated with the song to media metadata 114. In some implementations, the song (e.g., the actual media) does not need to be stored locally on user device 110 for the song to be included in media metadata 114. For example, the song can be stored on media server 150 (e.g., a cloud media server, media subscription server, etc.) and accessed through network 160 (e.g., a local area network, wide area network, Internet, etc.).

In some implementations, media application 112 can include media library 120. For example, media application 112 can dynamically generate media library 120 based on the media item metadata stored in media metadata 114. Media metadata 114 can include entries that describe all media items in the user's media library 120 and user playlists (e.g., playlist 130). For example, if media metadata 114 includes metadata entries for media item 122 and media item 124, then media item 122 and media item 124 can be included in media library 120. Media library 120 can include all of the media items described in media metadata 114. Media library 120 can include a portion (e.g., less than all) of the media items described in media metadata 114. For example, media library 120 may include media items that are not identified as playlist-only media items in media metadata 114 and exclude media items that are identified as playlist-only media items in media metadata 114.

In some implementations, media application 112 can include playlist 130. For example, playlist 130 can be an ordered media item collection created and/or managed by the user of user device 110. Playlist 130 can include, for example, data identifying each media item (e.g., media item 122) that the user has added to playlist 130 and the position or order of each media item the playlist 130.

In some implementations, media application 112 can add a media item to playlist 130 without adding the media item to media library 120. For example, the user of user device 110 can interact with (e.g., provide input to) a graphical user interface (GUI) of media application 112 to add media item 132 (e.g., from a subscription service or cloud resource) to playlist 130. While interacting with media application 112, the user can provide input indicating that media item 132 should be a playlist-only media item. When media application 112 receives the input indicating that media item 132 should be a playlist-only media item, media application 112 can update the metadata in media metadata 114 corresponding to media item 132 to indicate that the media item is a playlist-only media item. For example, media metadata 114 can include a data field (e.g., a true/false flag) for each media item in media metadata 114 that indicates whether the corresponding media item is a playlist-only media item. In the example above, media application 112 can set the value of the playlist-only data field for media item 132 to 'true' to indicate that the added media item is a playlist-only media item. In some implementations, media application 112 can set the value of the playlist-only data field for media item 132 based on a default value (e.g., true or false) configured for media application 112.

In some implementations, media application 112 can generate media library 120 based on the playlist-only data field of media metadata 114. For example, media application 112 can exclude media items that have been identified or marked as playlist-only in media metadata 114 from media library 120. Thus, while media library 120 includes media items 122 and 124, media library 120 excludes media item 132 because media item 132 is a playlist-only media item.

In some implementations, media application 112 can perform various operations or functions on media library 120 that exclude playlist-only media items. For example, a user can request a search for a media item in media library 120. Since, playlist-only media items are excluded from media library 120, the search results will not include playlist-only media items. Similarly, the user can configure a smart playlist that dynamically adds media items to the smart playlist from media library 120 based on user-specified criteria (e.g., search terms). Since the smart playlist adds media items from media library 120, the smart playlist will not include playlist only media items. Thus, the search results and/or smart playlist will only include media items that the user has selected (e.g., that the user wants) to be included in the user's media library 120.

In some implementations, user device 110 can synchronize media metadata 114 with other computing devices. For example, user device 110 can synchronize media metadata 114, including default playlist-only value and individual media item playlist-only values, with user account 152 on media server 150. User account 152 can be, for example, a user account of the user of user device 110. User account 152 can be a user account of a cloud media service, an online media store, or an online storage service, for example. Media application 112 can send media metadata 114 to media server 150 so that media server 150 can update media metadata 154 in user account 152 based on changes made to media metadata 114. For example, media application 112 can send media metadata 114 to media server 150 when a new media item is added to media metadata 114 and/or when the metadata for a media item is modified (e.g., when the playlist-only field of a media item is changed). Media server 150 can merge or synchronize media metadata 114 with media metadata 154 so that media metadata 154 reflects the changes or updates made to media metadata 114 on user device 110.

In some implementations, after media metadata 154 is updated at media server 150, media server 150 can send the updated media metadata 154 to other user devices associated with user account 152. For example, media server 150 can send the media metadata (or a portion thereof) to user device 140 so that media application 142 can update media metadata 144 based on the changes made to media metadata 154. Thus, each user device (e.g., user device 110, user device 140) associated with user account 152 can be synchronized and configured with the same playlist-only media items.

In some implementations, media server 150 can be configured to add playlist-only field values to media metadata generated by other devices. For example, user device 140 may be a device that is not configured for playlist-only media items. The user of user device 140 may add a media item to a playlist using user device 140. User device 140 may synchronize the playlist data and media metadata 144 from user device 140 with media server 150. When media server 150 receives the playlist data and media metadata 144, media server 150 can merge (e.g., synchronize) media metadata 144 with media metadata 154. Since media metadata 144 does not have a playlist-only value for the added media item, media server 150 can set the playlist-only value for the added media item to the default playlist-only value received from user device 110 when merging media metadata 144 with media metadata 154. Thus, media server 150 can enforce the desired playlist-only behavior specified by the user of user device 110.

FIG. 2 illustrates example media metadata 200 for implementing playlist-only media items. For example, media metadata 200 can correspond to media metadata 114 of FIG.

1. In some implementations, media metadata 200 can include metadata for media items in the user's media library and playlists. When a media item is added to the use's library or playlists, media application 112 can add metadata for the media item to media metadata 200. For example, media metadata 200 can include metadata entries 222, 224 and 232 for media items 122, 124 and 132, respectively.

In some implementations, metadata entries in media metadata 200 can include identifier field 202. For example, identifier field 202 can store a globally unique identifier that is assigned to a media item by a media vendor (e.g., an online media store, media subscription service 156, etc.). The globally unique identifier can be used to identify the corresponding media item across all devices associated with accounts with the media vendor.

In some implementations, media entries in media metadata 200 can include metadata field 204. For example, metadata field 204 can store descriptive data with respect to the corresponding media item. For example, metadata filed 204 can include information identifying the artist, genre, tempo, duration and/or other descriptive information about the corresponding media item.

In some implementations, media entries in media metadata 200 can include asset pointer field 206. For example, asset pointer field 206 can store a pointer (e.g., uniform resource locator "URL," memory pointer, directory location, etc.) that describes a location (e.g., local or network) where the corresponding media item (e.g., media asset, audio file, etc.) can be found. Media application 112 can use the asset pointer to obtain the corresponding media asset so that media application 112 can playback or present the media asset to the user.

In some implementations, media entries in media metadata 200 can include playlist only field 208. For example, playlist only field 208 can store a Boolean value (e.g., true, false) that indicates whether the corresponding media item is a playlist-only media item. For example, the playlist only field of entry 222 (media item 122) stores a 'false' value. Thus, media item 122 is not a playlist-only media item and media item 122 will be included in the user's media library 120. The playlist-only field of entry 232 (media item 132) stores a 'true' value. Thus, media item 132 is a playlist-only media item and media item 132 will not be included in the user's media library 120.

In some implementations, the user can specify the default value for playlist-only field 208. For example, media application 112 can prompt the user to set the default playlist-only field value when the user adds a media item to a playlist, as described in further detail below. If the user has not set the default value for playlist only filed 208, media application 112 can use 'true' as the default value for playlist-only field 208. In some implementations, whenever a new media item is added to a playlist, media application 112 can set the value of the playlist only field 208 to the default value.

In some implementations, the user can change the value of the playlist-only field 208 for a media item. For example, media application 112 can present a representation of media item 132 on a GUI of media application 112 and present graphical elements that allow the user to change the value playlist-only field 208 of media item 132 (entry 232) from true to false or from false to true, as described further below.

Graphical User Interfaces

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Figure 3:
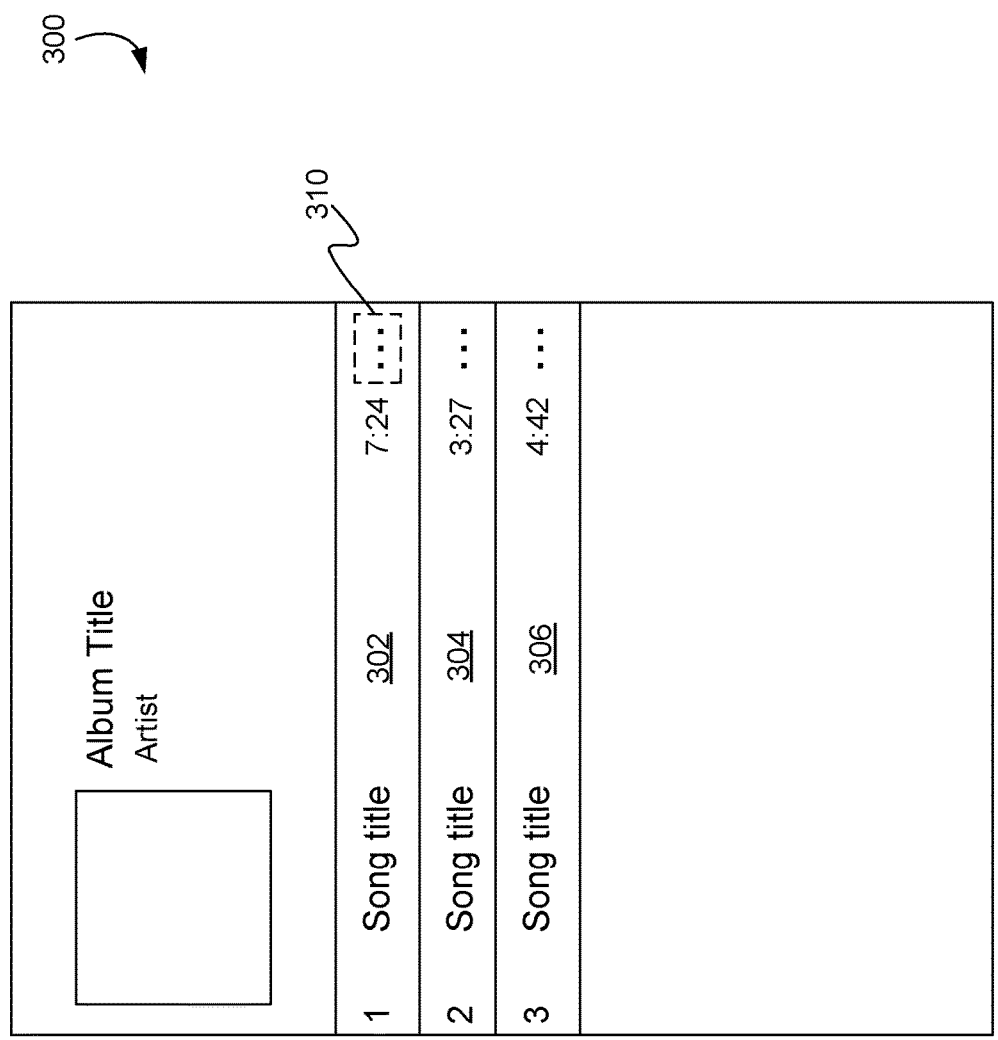
FIG. 3 illustrates an example graphical user interface for selecting a media item to add to a playlist.

FIG. 3 illustrates an example graphical user interface 300 for selecting a media item to add to a playlist. For example, GUI 300 can be a graphical user interface presented by media application 112 on a display of user device 110. GUI 300 can, for example, present media items available from a media subscription service (e.g., streaming audio service, music subscription service, etc.). GUI 300 can present, for example, songs 302, 304 and/or 306 of an album made available to the user through media application 112 when the user has an active subscription to media subscription service 156.

In some implementations, media application 112 can add media item 302 from media subscription service 156 to a playlist. For example, the user of user device 110 can select graphical element 310 to cause media application 112 to present an options menu for media item 302, as illustrated by FIG. 4.

Figure 4:
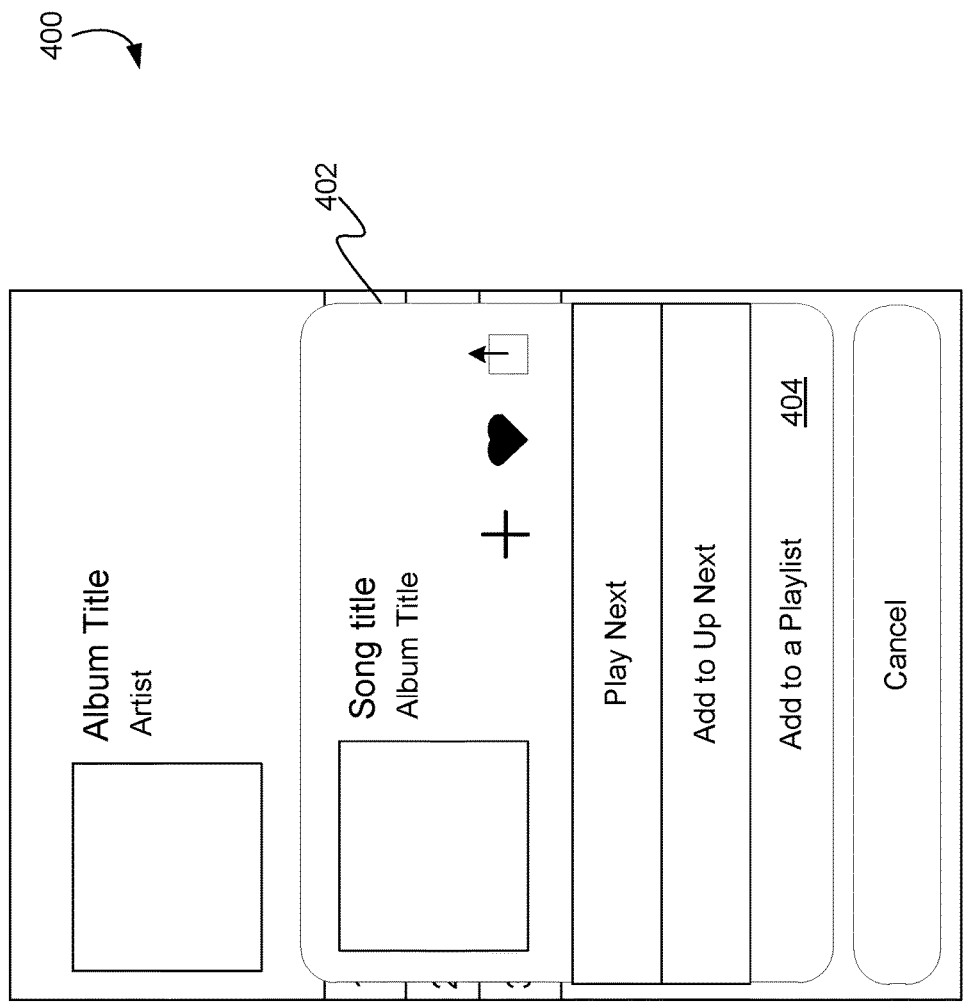
FIG. 4 illustrates an example graphical user interface for adding a media item to a playlist.

FIG. 4 illustrates an example graphical user interface 400 for adding a media item to a playlist. For example, media application 112 can present options menu 402 on a display of user device 110 in response to receiving a user selection of graphical element 310 of GUI 300.

In some implementations, options menu 402 can include an option 404 to add media item 302 to a playlist. For example, in response to receiving user input selecting option 404, media application 112 can present one or more graphical user interface elements (not shown) that allow the user to select or create a playlist to which media item 302 is to be added. After the user has selected or created the playlist, media application 112 can prompt the user to set the default playlist-only value for media items added to playlists in the future, as illustrated by FIG. 5.

Figure 5:
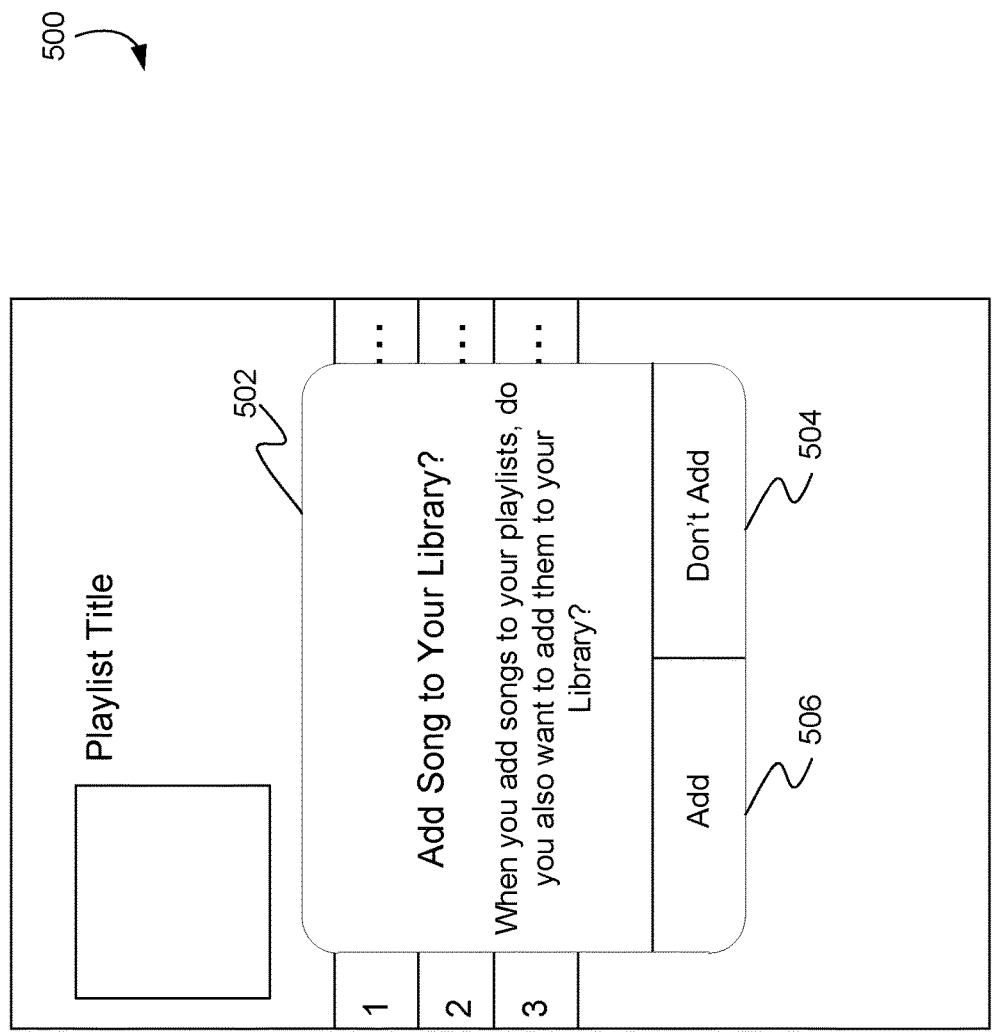
FIG. 5 illustrates an example graphical user interface for setting the default playlist-only value for media items.

FIG. 5 illustrates an example graphical user interface 500 for setting the default playlist-only value for media items. For example, graphical element 502 can be presented by music application 112 on a display of user device 110 in response to a user selecting option 404 and specifying a playlist to which media item 302 should be added.

In some implementations, graphical element 502 can present a prompt asking the user to set the default playlist-only value for media items added to user playlists. Graphical element 502 (e.g., the prompt) can be presented the first time a user adds a media item to a playlist so that the user can specify the default behavior for adding a media item to a playlist. The prompt can, for example, ask the user whether media application 112 should add media items added to playlists in the future to the user's media library (e.g., media library 120). When the user selects graphical element 504, media application 112 will not add media items to the user's media library when the user adds media items to playlists in the future. For example, when the user selects graphical element 504, media application 112 can update media metadata 200 to set the value of the playlist-only field of the corresponding media item to 'false' so that the media item will not be included in media library 120. When the user selects graphical element 506, media application 112 will automatically add media items to the user's media library when the user adds media items to playlists in the future. For example, when the user selects graphical element 504, media application 112 will update media metadata 200 to set the value of the playlist-only field of the corresponding media item to 'true' so that the media item will be included in media library 120.

In some implementations, the user can change the default playlist-only value for media items. For example, media application 112 can present a settings menu (not shown) that the user can interact with to change the default playlist-only value from 'true' to 'false' or from 'false' to 'true'. In some implementations, if the user changes the default playlist-only value from 'true' to 'false' (e.g., to add media items to the user's library), media application 112 can retroactively add media items previously marked as playlist-only to the user's media library 120. For example, media application 112 can present a graphical element (not shown) that allows the user to select whether to retroactively add media items previously marked as playlist-only to the user's media library 120. In some implementations, if the user changes the default playlist-only value from 'false' to 'true' (e.g., mark added media items as playlist-only), media application 112 can leave previously added media items in the user's media library 120.

Figure 6:
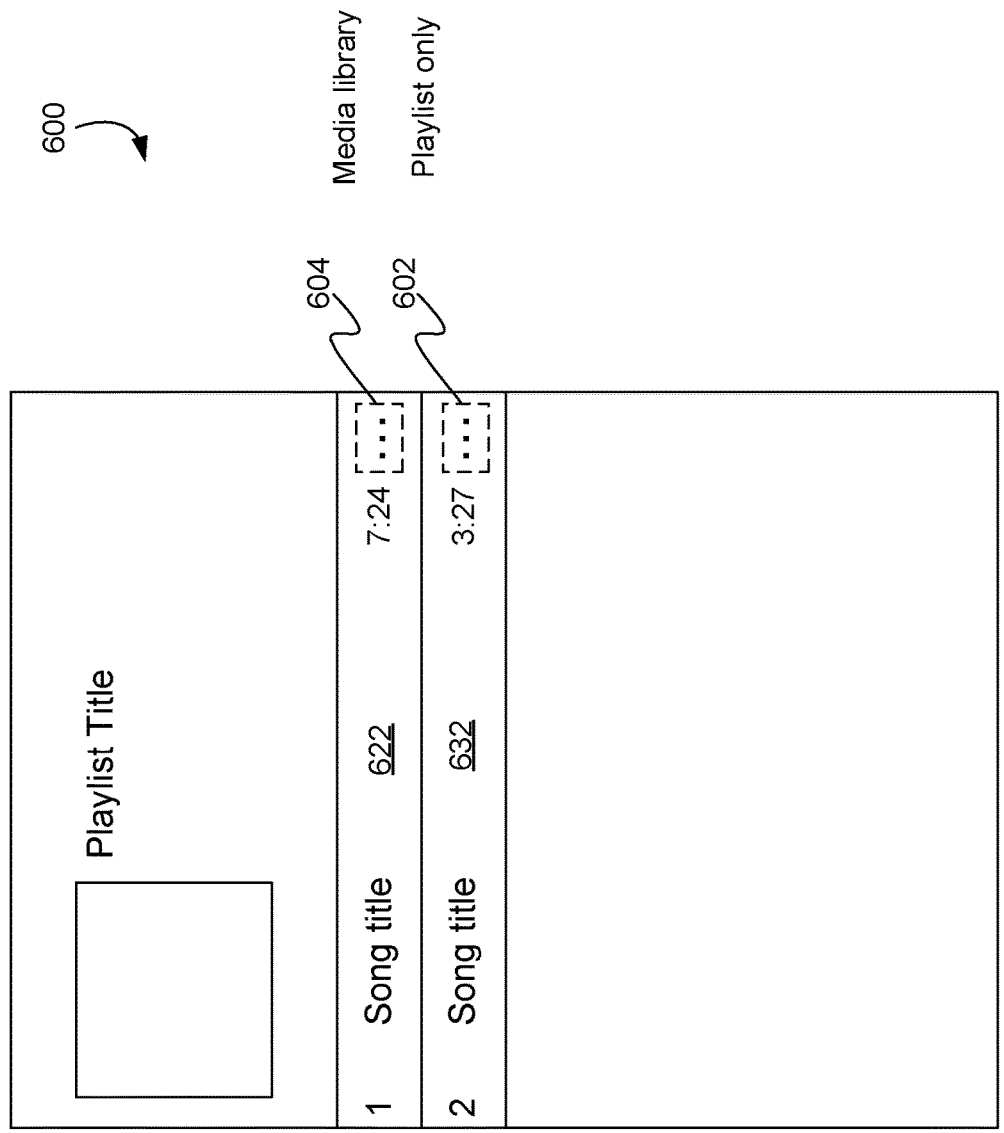
FIG. 6 illustrates an example graphical user interface for presenting options for a media item in a user's playlist.

FIG. 6 illustrates an example graphical user interface 600 for presenting options for a media item in a user's playlist. For example, GUI 600 can be presented by media application 112 on a display of user device 110 in response to receiving input selecting to view a playlist (e.g., playlist 130). GUI 600 can present graphical elements 622 and 632 representing media items 122 and 132 of playlist 130, respectively. For example, graphical elements 622 and 632 can present information identifying and/or describing the media items in playlist 130. For example, graphical elements 622 and 632 can present information from metadata field 204 of media metadata 200 for each media item in playlist 130.

In some implementations, a user can select graphical element 602 or graphical element 604 to present options for respective media items. For example, because graphical element 622 corresponds to media item 122 which is in the user's media library 120 and graphical element 632 corresponds to media item 132 which is a playlist-only media item, different options can be presented by media application 112 when the user selects graphical element 602 and/or graphical element 604.

Figure 7:
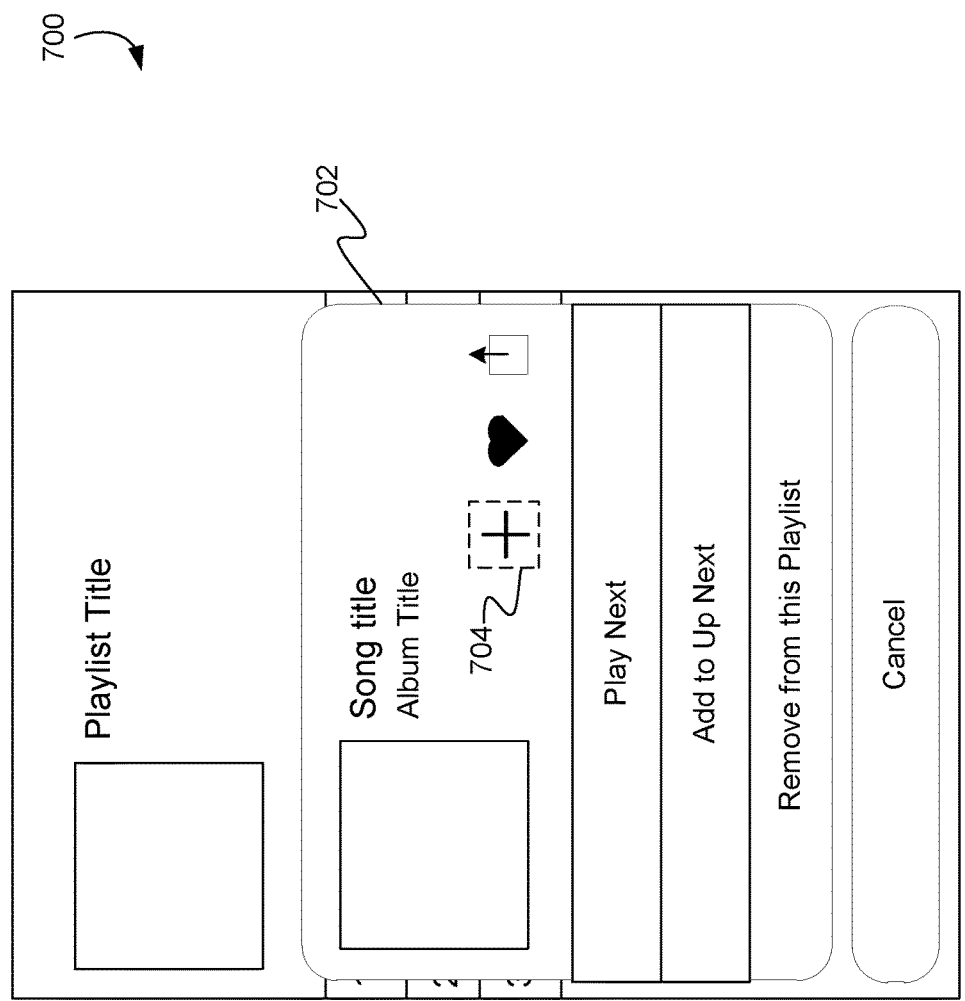
FIG. 7 illustrates an example graphical user interface for presenting options for a playlist-only media item.

FIG. 7 illustrates an example graphical user interface 700 for presenting options for a playlist-only media item. For example, when the user selects graphical element 602 of FIG. 6, media application 112 can determine whether media item 132 is a playlist-only media item based on the value of the playlist-only field for media item 132 in media metadata 200. When media application 112 determines that media item 132 is a playlist-only media item, media application 112 can present graphical element 702 on GUI 700. For example, graphical element 702 can be a window, overlay, or menu that presents options for media item 132.

In some implementations, graphical element 702 can include a graphical element 704 for adding a playlist-only media item to the user's media library 120. For example, in response to receiving a selection of graphical element 704, media application 112 can change the value of the playlist-only field for media item 132 in media metadata 200 from 'true' to 'false' thereby causing application 112 to include media item 132 in the user's media library 120, as described above.

Figure 8:
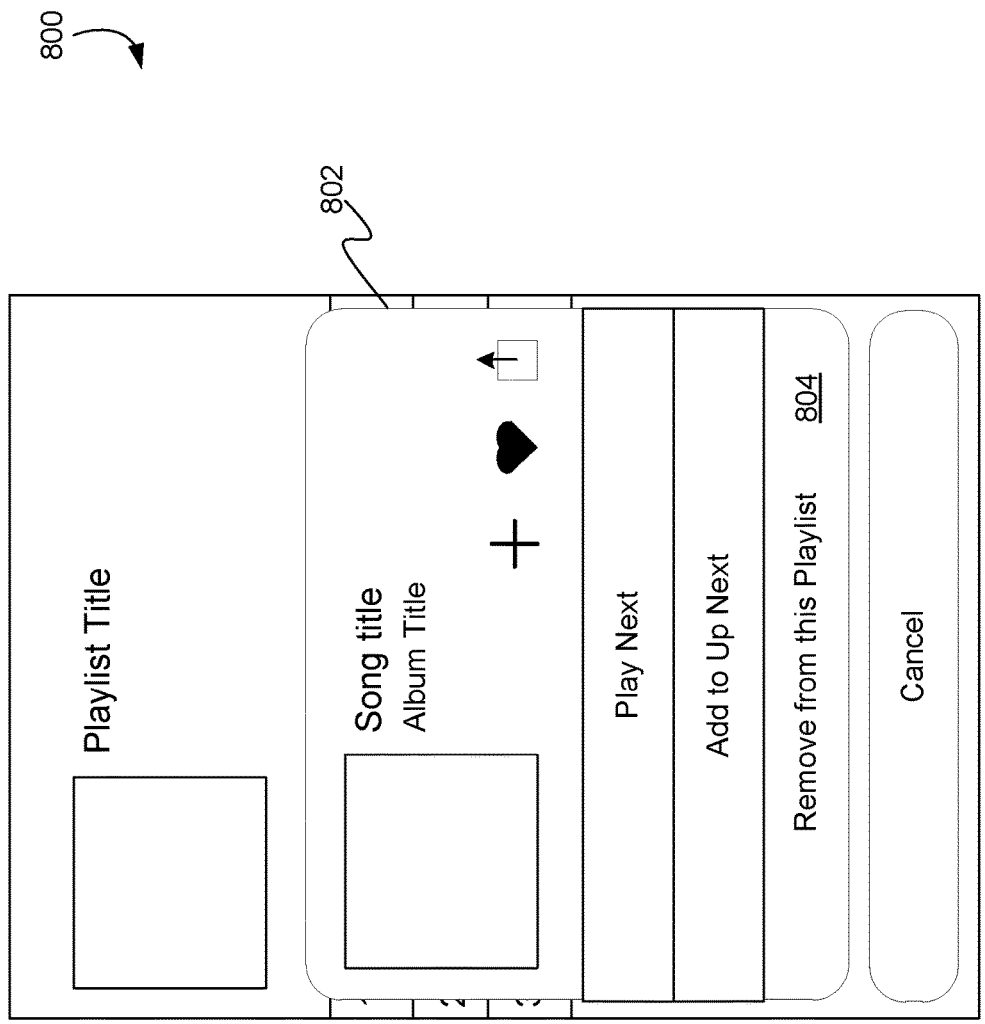
FIG. 8 illustrates an example graphical user interface for removing a media item from a playlist.

FIG. 8 illustrates an example graphical user interface 800 for removing a media item from a playlist. For example, when the user selects graphical element 602 or graphical element 604 corresponding to media items 122 and 132 in playlist 130, media application 112 can present graphical element 802. For example, graphical element 802 can be a window, overlay, or menu that presents options for media items 122 and/or 132.

In some implementations, graphical element 802 can present an option 804 for removing a media item from a playlist. For example, when the user selects option 804, music application 112 can remove the corresponding media item (e.g., media item 122 or 132) from playlist 130. If the media item (e.g., media item 122) is included in the user's media library 120, the media item will remain in media library 120. If the media item (e.g., media item 132) is a playlist-only media item and is not included in any other playlists, then the metadata entry (e.g., entry 232) corresponding to the media item can be removed from media metadata 200.

Figure 9:
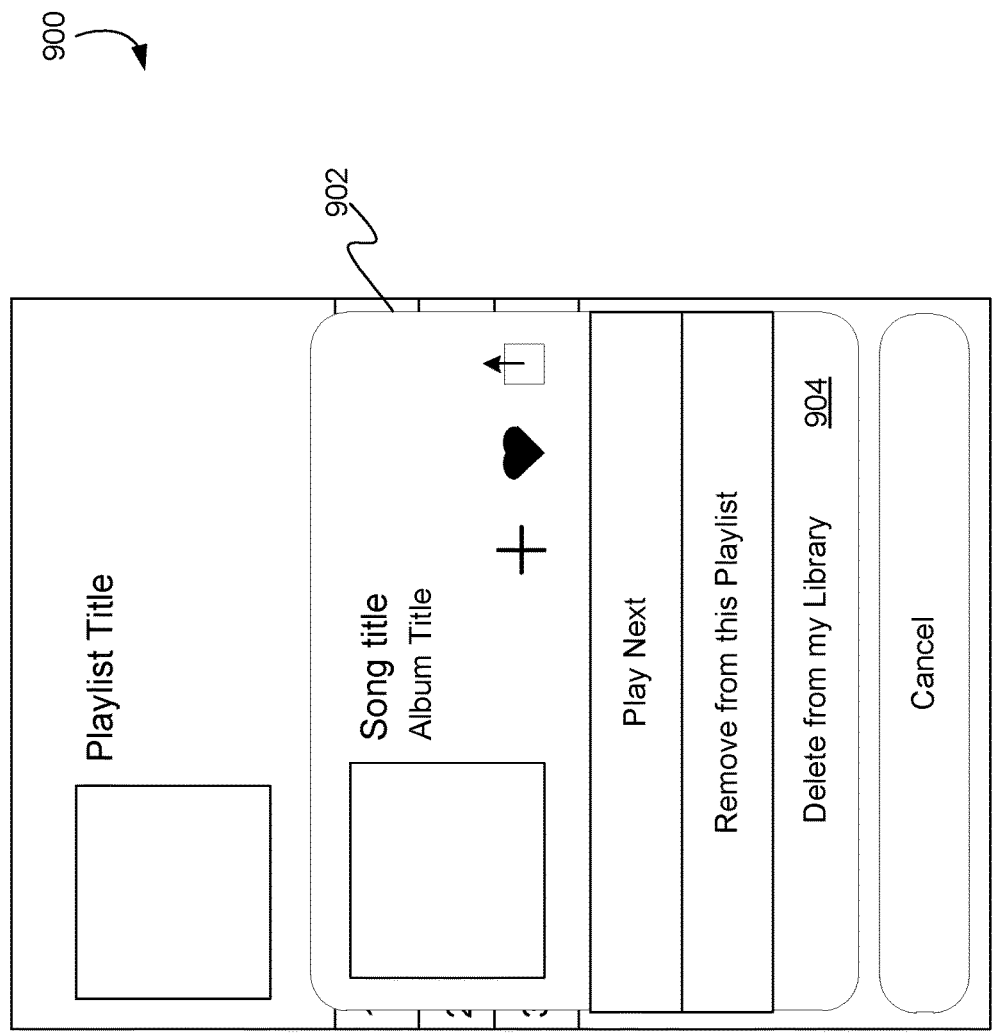
FIG. 9 illustrates an example graphical user interface for deleting a media item from the user's media library.

FIG. 9 illustrates an example graphical user interface 900 for deleting a media item from the user's media library. For example, graphical element 902 can be presented by media application 112 in response to the user selecting graphical element 604 of GUI 600 corresponding to media item 122 of FIG. 1. Graphical element 902 can include option 904 for removing a media item (e.g., media item 122) from the user's media library 120. For example, in response to receiving a selection of option 904, media application 112 can remove media item 122 from media library 120.

In some implementations, media application 112 can remove media item 122 from media library 120 all user playlists (e.g., playlist 130). For example, media application 112 can remove media item 122 from media library 120 by removing the metadata entry for media item 122 from media metadata 200. Media application 112 can remove media item 122 from playlists by removing the identifier for media item 122 from each playlist.

In some implementations, media application 112 can remove media item 122 from media library 120 by changing the value of the playlist-only field for media item 122 in media metadata 200 to 'true'. Since media item 122 is now a playlist-only media item, media item 122 will remain in playlist 130 (and other playlists) while being effectively removed from (e.g., not included in) media library 120, as described above.

In some implementations, media application 112 can present a prompt asking whether the user wants to remove media item 122 from playlists in addition to removing the media item from media library 120. For example, media application 112 can receive user input specifying whether to remove media item 122 from media library 120 only or whether to remove media item 122 from media library 120 and user playlists. Upon receiving input specifying that the user wishes to remove media item 122 from media library 120 only, media application 112 can remove media item 122 from media library 120 by changing the value of the playlist-only field for media item 122 in media metadata 200 to 'true', as described above. Upon receiving input specifying that the user wishes to remove media item 122 from media library 120 and all user playlists, media application 112 can remove media item 122 from media library 120 all user playlists (e.g., playlist 130), as described above.

Example Processes

Figure 10:
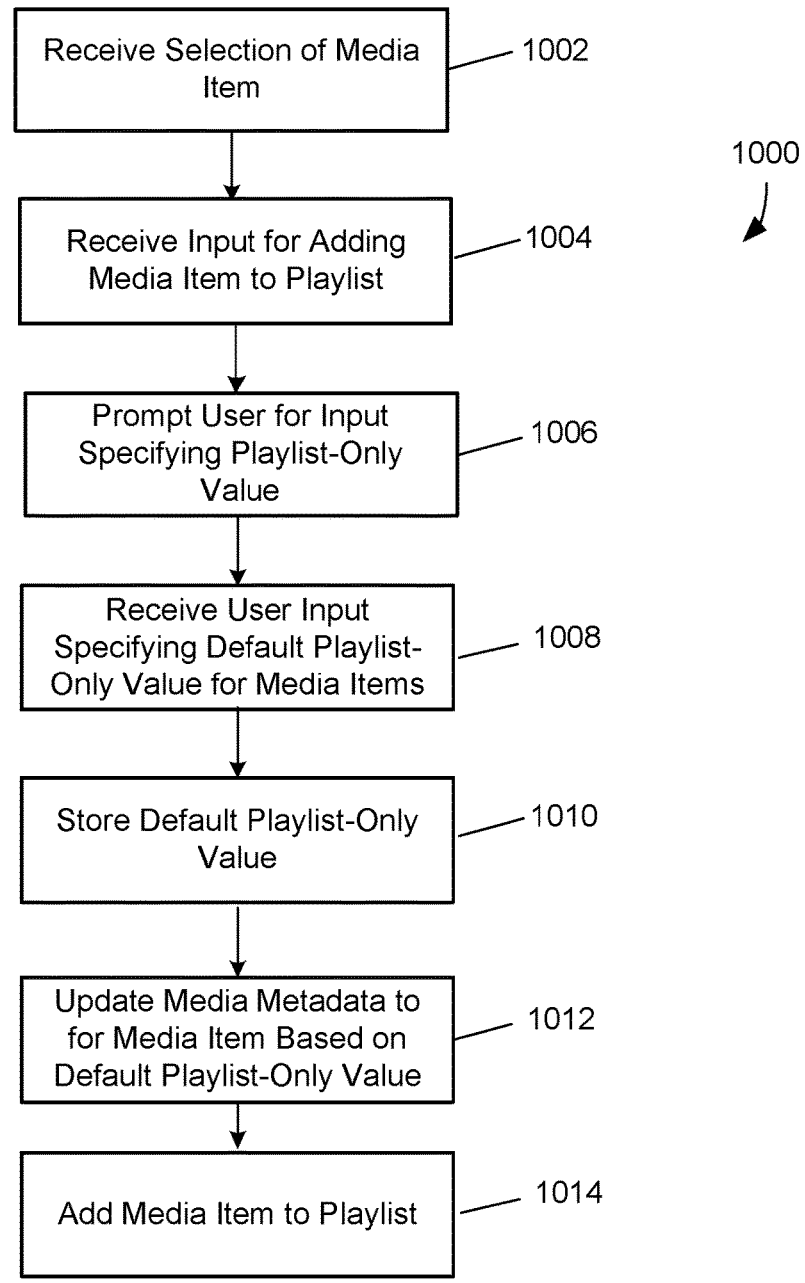
FIG. 10 is flow diagram of an example process for adding a playlist-only media item to a user's playlist.

FIG. 10 is flow diagram of an example process 1000 for adding a playlist-only media item to a user's playlist. For example, computing device 110 can prompt the user to set the default playlist-only value for media items added to the user's playlist. In some implementations, only media items added from a subscription service or cloud service can be marked as playlist-only media items (e.g., playlist-only value=true). In some implementations, any media item can be marked as a playlist-only media item.

At step 1002, computing device 110 can receive a selection of a media item. For example, media application 112 can receive user input selecting a media item from a list of media items presented on a display of computing device 110, as described above with reference to FIG. 3.

At step 1104, computing device 110 can receive user input for adding a media item to a playlist. For example, media application 112 can receive user input indicating that the user would like to add the selected media item to a playlist and allow the user to create and/or select a playlist, as described above with reference to FIG. 4.

At step 1006, computing device 110 can prompt the user for input specifying a default playlist-only value. For example, media application 112 can present graphical element 502 of FIG. 5 to prompt the user to specify a default playlist-only value for media items added to a playlist in the future. In some implementations, the prompt is presented the first time the user adds a media item to a playlist. As described, below the system can save the user's selection as a default 'playlist-only' value and apply the value to media items added to user playlists in the future.

At step 1008, computing device 110 can receive user input specifying the default playlist-only value for media items when added to playlists. For example, the user can provide input indicating that the default playlist-only value should be true or false. Each media item added to a playlist (e.g., any user playlist associated with the user) thereafter will be associated with the default playlist-only value. The user can change the playlist-only value of media items as described with reference to FIGS. 6, 7, and/or 8.

At step 1010, computing device 110 can store the default playlist-only value specified by the user. For example, media application 112 can store the default playlist-only value in media metadata 200 or in another storage location associated with media application 112 on computing device 110.

At step 1012, computing device 110 can update the media metadata for the media item based on the default playlist-only value. For example, media application 112 can store metadata for the media item in media metadata 200 and set the playlist-only value for the media item in media metadata 200 to the user-specified default value.

At step 1014, computing device 110 can add the media item to the user selected playlist. For example, media application 112 can add the identifier corresponding to the media item to the user selected playlist.

Figure 11:
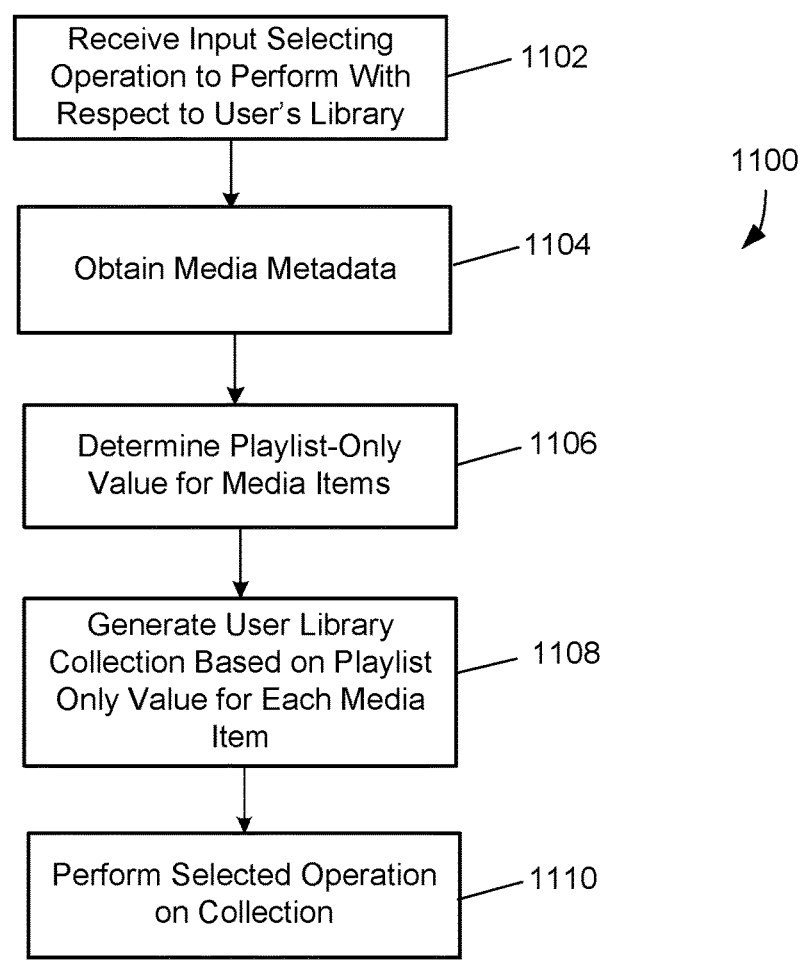
FIG. 11 is a flow diagram of an example process for performing media application operations based on playlist-only media items.

FIG. 11 is a flow diagram of an example process 1100 for performing media application operations based on playlist-only media items. For example, media application 112 can perform operations such as displaying a view of the user's media library and searching the user's media library. The result of these operations may be affected by the playlist-only values assigned to media items in media metadata 200.

At step 1102, computing device 110 can receive input selecting an operation to perform with respect to the user's library. For example, media application 112 can receive user input requesting to view the user's media library on a display of computing device 110. Media application 112 can receive user input requesting to search the user's media library for media items corresponding to user-specified search criteria. Media application 112 can receive user input limiting the search to the user's media library. For example, media application 112 can present graphical elements that allow the user to select between searching all media items in the user's library and/or playlists or just the media items in the user's library (e.g., media items not marked as 'playlist-only').

At step 1104, computing device 110 can obtain media metadata. For example, media application 112 can obtain media metadata 200 that includes metadata for each media item in the user's media library and playlists.

At step 1106, computing device 110 can determine the playlist-only value for media items in the media metadata. For example, media application 112 can determine which media items in media metadata 200 are playlist-only media items and which media items are not playlist-only media items based on the value in the playlist-only field for each media item in media metadata 200, as described above with reference to FIG. 2.

At step 1108, computing device 110 can generate a user library collection based on the playlist-only value for each media item. For example, media application 112 can include media items that are not playlist-only media items (e.g., playlist-only value is 'false') in the user library collection of media items.

At step 1110, computing device 110 can perform the user selected operation on the user library collection of media items. For example, if the user has selected to view the user's media library, media application 112 can present a view of the user library collection of media items. If the user has selected to search the user's media library, media application 112 can search the user library collection of media items according to the user-specified search criteria and present the search results on a display of computing device 110.

Figure 12:
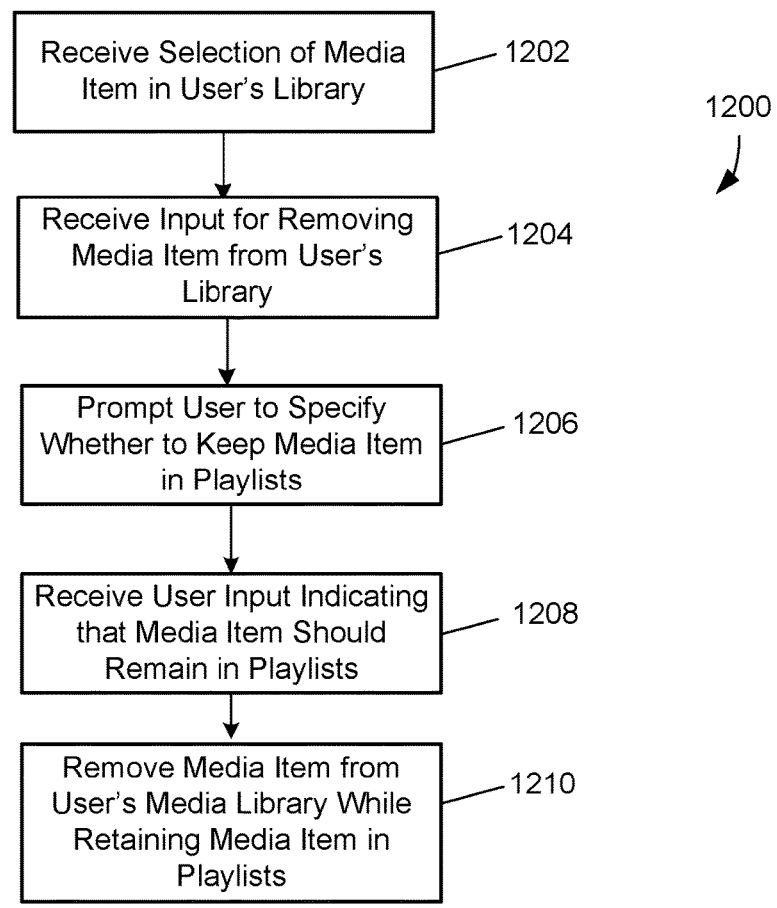
FIG. 12 is a flow diagram of an example process 1200 for removing a media item from the user's media library.

FIG. 12 is a flow diagram of an example process 1200 for removing a media item from the user's media library. For example, computing device 110 can remove a media item from the user's media library while retaining the media item in user playlists by marking the media item as a playlist-only media item. Computing device 110 can mark the media item as a playlist-only media item by setting the value of the playlist-only field for the media item in media metadata 200 to 'true'.

At step 1202, computing device 110 can receive a selection of a media item in the user's library. For example, media application 112 can receive a selection of a media item as described with reference to FIG. 6.

At step 1204, computing device 110 can receive input for removing the selected media item from the user's library. For example, media application 112 can receive user input indicating that the user wishes to remove the selected media item from the user's library, as described with reference to FIG. 9.

At step 1206, computing device 110 can prompt the user to specify whether to keep the selected media item in user playlists. For example, media application 112 can present a prompt that asks the user to provide input specifying whether the selected media item should be removed from user playlists when the selected media item is removed from the user's library. The prompt can present a "keep in playlists" option that indicates the user wishes to keep the selected media item in the user's playlists after removing the media item from the user's media library. The prompt can present a "remove from playlists" option that indicates the user wishes to remove the selected media item from the user's media library and user playlists.

At step 1208, computing device 110 can receive user input indicating that the selected media item should remain in user playlists. For example, media application 112 can receive user input selecting a "keep in playlists" option presented on the prompt presented at step 1206.

At step 1210, computing device 110 can remove the selected media item from the user's media library while retaining the media item in the user's playlists. For example, in response to receiving the user input selecting the "keep in playlists" option, media application 112 can change the value of the playlist-only field for the selected media item in media metadata 200 to true. By marking the selected media item as a playlist-only media item, media application 112 can cause the selected media item to be removed from the user's media library while keeping the media item in the user's playlists. In contrast, had the user selected the "remove from playlists" option above, media application 112 can remove the selected media item from the user's media library and playlists by deleting the metadata entry corresponding to the selected media item from media metadata 200 and deleting the identifier corresponding to the selected media item from each user playlist.

Example System Architecture

Figure 13:
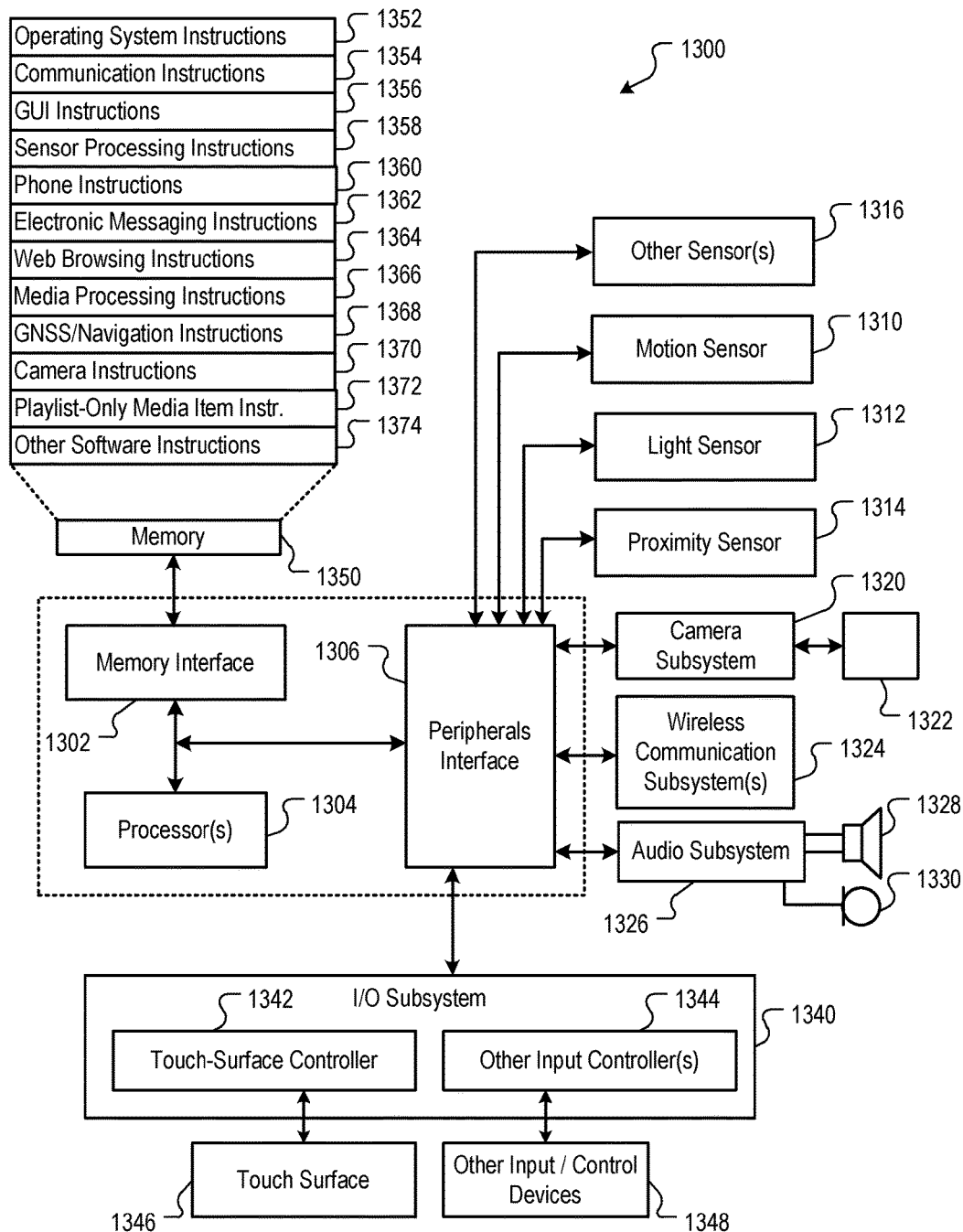
FIG. 13 is a block diagram of an example computing device 1300 that can implement the features and processes of FIGS. 1-12.

FIG. 13 is a block diagram of an example computing device 1300 that can implement the features and processes of FIGS. 1-12. The computing device 1300 can include a memory interface 1302, one or more data processors, image processors and/or central processing units 1304, and a peripherals interface 1306. The memory interface 1302, the one or more processors 1304 and/or the peripherals interface 1306 can be separate components or can be integrated in one or more integrated circuits. The various components in the computing device 1300 can be coupled by one or more communication buses or signal lines.

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate orientation, lighting, and proximity functions. Other sensors 1316 can also be connected to the peripherals interface 1306, such as a global navigation satellite system (GNSS) (e.g., GPS receiver), a temperature sensor, a biometric sensor, magnetometer or other sensing device, to facilitate related functionalities.

A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips. The camera subsystem 1320 and the optical sensor 1322 can be used to collect images of a user to be used during authentication of a user, e.g., by performing facial recognition analysis.

Communication functions can be facilitated through one or more wireless communication subsystems 1324, which can include radio frequency receivers and transmitters and/or optical (e.g., infrared) receivers and transmitters. The specific design and implementation of the communication subsystem 1324 can depend on the communication network(s) over which the computing device 1300 is intended to operate. For example, the computing device 1300 can include communication subsystems 1324 designed to operate over a GSM network, a GPRS network, an EDGE network, a Wi-Fi or WiMax network, and a Bluetooth™ network. In particular, the wireless communication subsystems 1324 can include hosting protocols such that the device 100 can be configured as a base station for other wireless devices.

An audio subsystem 1326 can be coupled to a speaker 1328 and a microphone 1330 to facilitate voice-enabled functions, such as speaker recognition, voice replication, digital recording, and telephony functions. The audio subsystem 1326 can be configured to facilitate processing voice commands, voiceprinting and voice authentication, for example.

The I/O subsystem 1340 can include a touch-surface controller 1342 and/or other input controller(s) 1344. The touch-surface controller 1342 can be coupled to a touch surface 1346. The touch surface 1346 and touch-surface controller 1342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1346.

The other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of the speaker 1328 and/or the microphone 1330.

In one implementation, a pressing of the button for a first duration can disengage a lock of the touch surface 1346; and a pressing of the button for a second duration that is longer than the first duration can turn power to the computing device 1300 on or off. Pressing the button for a third duration can activate a voice control, or voice command, module that enables the user to speak commands into the microphone 1330 to cause the device to execute the spoken command. The user can customize a functionality of one or more of the buttons. The touch surface 1346 can, for example, also be used to implement virtual or soft buttons and/or a keyboard.

In some implementations, the computing device 1300 can present recorded audio and/or video files, such as MP3, AAC, and MPEG files. In some implementations, the computing device 1300 can include the functionality of an MP3 player, such as an iPod™. The computing device 1300 can, therefore, include a 36-pin connector that is compatible with the iPod. Other input/output and control devices can also be used.

The memory interface 1302 can be coupled to memory 1350. The memory 1350 can include high-speed random access memory and/or non-volatile memory, such as one or more magnetic disk storage devices, one or more optical storage devices, and/or flash memory (e.g., NAND, NOR). The memory 1350 can store an operating system 1352, such as Darwin, RTXC, LINUX, UNIX, OS X, WINDOWS, or an embedded operating system such as VxWorks.

The operating system 1352 can include instructions for handling basic system services and for performing hardware dependent tasks. In some implementations, the operating system 1352 can be a kernel (e.g., UNIX kernel). In some implementations, the operating system 1352 can include instructions for performing voice authentication. For example, operating system 1352 can implement the playlist-only media item features as described with reference to FIGS. 1-12.

The memory 1350 can also store communication instructions 1354 to facilitate communicating with one or more additional devices, one or more computers and/or one or more servers. The memory 1350 can include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GNSS/Navigation instructions 1368 to facilitate GNSS and navigation-related processes and instructions; and/or camera instructions 1370 to facilitate camera-related processes and functions.

The memory 1350 can store other software instructions 1372 to facilitate other processes and functions, such as the playlist-only media item processes and functions as described with reference to FIGS. 1-12.

The memory 1350 can also store other software instructions 1374, such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions of the computing device 1300 can be implemented in hardware and/or in software, including in one or more signal processing and/or application specific integrated circuits.

What is claimed is:

1. A method comprising:
   storing, at a computing device, media metadata and media playlist definitions associated with a media account of a user, wherein the media metadata indicates whether one or more media items belong in a user-defined media library comprising a set of one or more media items defined by the user;
   presenting, by the computing device, a representation of a first media item on a display of the computing device;
   receiving, by the computing device, a first user input selecting the first media item;
   presenting, by the computing device, a prompt for a second user input that indicates whether the first media item should be a playlist only media item;
   receiving, by the computing device, in response to the prompt the second user input indicating that the first media item should be a playlist only media item;
   updating, by the computing device, a playlist only field in the media metadata with a playlist only indication that indicates that the first media item should be excluded from storage in the user-defined media library;
   excluding, by the computing device, the first media item from storage in the user-defined media library based on the playlist only indication; and
   updating, by the computing device, a media playlist definition for a first media playlist accessible by the user to indicate that the first media item is in the first media playlist despite the first media item being excluded from storage in the user-defined media library; and
   including, by the computing device, a second media item in the user-defined media library and the first media playlist in response to a media metadata associated with the second media item indicating that the second media item is not a playlist only media item.

2. The method of claim 1, further comprising:
   receiving, by the computing device, a third user input for performing an operation on the user-defined media library;
   identifying, by the computing device, the one or more media items in a media item metadata stored in the media metadata that should be included in the storage of the user-defined media library based on the playlist only field of the media metadata;
   generating, by the computing device, based on the identified media items, a collection of media items corresponding to the user-defined media library, wherein the generated collection of media items excludes playlist only media items; and
   performing, by the computing device, the operation on the generated collection of media items.

3. The method of claim 2, wherein the operation is presenting the user-defined media library on the display of the computing device.

4. The method of claim 2, wherein the operation is searching the user-defined media library.

5. The method of claim 2, wherein the operation is maintaining a smart playlist based on the user-defined media library.

6. The method of claim 1, wherein the user-defined media library is separate from general storage of the computing device, and wherein the user-defined media library comprises media items selected by the user.

7. The method of claim 1, wherein the user-defined media library comprising a set of one or more media items that a user has access to from a media subscription service of the user.

8. The method of claim 1, wherein the first media item is accessible by the user at the computing device despite not being stored in the user-defined media library.

9. A non-transitory computer-readable medium including one or more sequences of instructions that, when executed by one or more processors, causes:
   storing, at a computing device, media metadata and media playlist definitions associated with a media account of a user, wherein the media metadata indicates whether one or more media items belong in a user-defined media library comprising a set of one or more media items defined by the user;
   presenting, by the computing device, a representation of a first media item on a display of the computing device;
   receiving, by the computing device, a first user input selecting the first media item;
   presenting, by the computing device, a prompt for a second user input that indicates whether the first media item should be a playlist only media item;

receiving, by the computing device, a second user input indicating that the first media item should be a playlist only media item;

updating, by the computing device, a playlist only field in the media metadata with a playlist only indication that indicates that the first media item should be excluded from storage in the user-defined media library;

excluding, by the computing device, the first media item from storage in the user-defined media library based on the playlist only indication; and updating, by the computing device, a media playlist definition for a first media playlist accessible by the user to indicate that the first media item is in the first media playlist despite the first media item being excluded from storage in the user-defined media library; and including, by the computing device, a second media item in the user-defined media library and the first media playlist in response to a media metadata associated with the second media item indicating that the second media item is not a playlist only media item.

10. The non-transitory computer-readable medium of claim 9, wherein the instructions cause:

receiving, by the computing device, a third user input for performing an operation on the user-defined media library;

identifying, by the computing device the one or more media items in a media item metadata stored in the media metadata that should be included in the storage of the user-defined media library based on the playlist only field of the media metadata;

generating, by the computing device, based on the identified media items, a collection of media items corresponding to the user-defined media library, wherein the generated collection of media items excludes playlist only media items; and performing, by the computing device, the operation on the generated collection of media items.

11. The non-transitory computer-readable medium of claim 10, wherein the operation is presenting the user-defined media library on the display of the computing device.

12. The non-transitory computer-readable medium of claim 10, wherein the operation is searching the user-defined media library.

13. The non-transitory computer-readable medium of claim 10, wherein the operation is maintaining a smart playlist based on the user-defined media library.

14. A system comprising:
one or more processors; and
a non-transitory computer-readable medium including one or more sequences of instructions that, when executed by one or more processors, causes:
storing, at a computing device, media metadata and media playlist definitions associated with a media account of a user, wherein the media metadata indicates whether one or more media items belong in a user-defined media library comprising a set of one or more media items defined by the user;

presenting, by the computing device, a representation of a first media item on a display of the computing device;

receiving, by the computing device, a first user input selecting the first media item;

presenting, by the computing device, a prompt for a second user input that indicates whether the first media item should be a playlist only media item;

receiving, by the computing device, in response to the prompt, the second user input indicating that the first media item should be a playlist only media item;

updating, by the computing device, a playlist only field in the media metadata with a playlist only indication that indicates that the first media item should be excluded from storage in the user-defined media library;

excluding, by the computing device, the first media item from storage in the user-defined media library based on the playlist only indication;

updating, by the computing device, a media playlist definition for a first media playlist accessible by the user to indicate that the first media item is in the first media playlist despite the first media item being excluded from storage in the user-defined media library; and including, by the computing device, a second media item in the user-defined media library and the first media playlist in response to a media metadata associated with the second media item indicating that the second media item is not a playlist only media item.

15. The system of claim 14, wherein the instructions cause:

receiving, by the computing device, a third user input for performing an operation on the user-defined media library;

identifying, by the computing device, the one or more media items in a media item metadata stored in media metadata that should be included in the storage of the user-defined media library based on the playlist only field of the media metadata;

generating, by the computing device, based on the identified media items, a collection of media items corresponding to the user-defined media library, wherein the generated collection of media items excludes playlist only media items; and performing, by the computing device, the operation on the generated collection of media items.

16. The system of claim 15, wherein the operation is presenting the user-defined media library on the display of the computing device.

17. The system of claim 15, wherein the operation is searching the user-defined media library.

18. The system of claim 15, wherein the operation is maintaining a smart playlist based on the user-defined media library.

* * * * *